United States Patent
Veerasamy et al.

(10) Patent No.: US 7,113,793 B2
(45) Date of Patent: *Sep. 26, 2006

(54) SYSTEM AND METHOD FOR IDENTIFYING COVERAGE HOLES IN A WIRELESS NETWORK

(75) Inventors: Jeyakesavan Veerasamy, Richardson, TX (US); Nanditha D. Dronamraju, Frisco, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 576 days.

This patent is subject to a terminal disclaimer.

(21) Appl. No.: 10/140,559

(22) Filed: May 7, 2002

(65) Prior Publication Data

US 2004/0203855 A1 Oct. 14, 2004

(51) Int. Cl.
*H04Q 7/20* (2006.01)
(52) U.S. Cl. ............... 455/456.1; 455/404.2; 455/423; 380/270
(58) Field of Classification Search ........ 455/423, 455/424, 425, 410, 404.2, 456.1, 456.3, 456.6, 455/427, 67.11; 380/270, 258
See application file for complete search history.

(56) References Cited

U.S. PATENT DOCUMENTS

| | | | |
|---|---|---|---|
| 6,463,287 B1* | 10/2002 | Wegner | 455/456.1 |
| 6,522,888 B1* | 2/2003 | Garceran et al. | 455/456.3 |
| 2002/0087263 A1* | 7/2002 | Wiener | 701/207 |
| 2002/0142797 A1* | 10/2002 | Tarighi et al. | 455/456 |
| 2002/0198002 A1* | 12/2002 | Ghandeharizadeh et al. | 455/456 |
| 2003/0013441 A1* | 1/2003 | Bhogal et al. | 455/423 |
| 2003/0035544 A1* | 2/2003 | Herle et al. | 380/258 |
| 2003/0054811 A1* | 3/2003 | Han et al. | 455/423 |
| 2003/0114145 A1* | 6/2003 | Boda et al. | 455/412 |
| 2003/0204721 A1* | 10/2003 | Barrus et al. | 713/153 |
| 2004/0203717 A1* | 10/2004 | Wingrowicz et al. | 455/423 |

\* cited by examiner

*Primary Examiner*—Joseph Feild
*Assistant Examiner*—Kamran Afshar

(57) ABSTRACT

In a mobile station capable of accessing a wireless network, an apparatus for reporting call drop (or service loss) location information associated with the mobile station to a server accessible via a communication network coupled to the wireless network. The apparatus comprises: 1) a memory capable of storing mobile station current position information; and 2) a controller, coupled to the memory, capable of determining a geographic location of the mobile station at the time an ongoing call is dropped by the mobile station (or a service loss occurs) and storing the geographic location in the memory, wherein the controller is further capable of establishing a connection with the server at a later point in time and transmitting the geographic location over the wireless network to the server.

19 Claims, 4 Drawing Sheets

SYSTEM AND METHOD FOR IDENTIFYING COVERAGE HOLES IN A WIRELESS NETWORK

TECHNICAL FIELD OF THE INVENTION

The present invention is directed, in general, to wireless networks and, more specifically, to a system for identifying coverage holes in a wireless network.

BACKGROUND OF THE INVENTION

Wireless communication systems, including cellular phones, paging devices, personal communication services (PCS) devices, and wireless data networks, have become ubiquitous in society. The prices of end-user wireless devices, such as cell phones, pagers, PCS systems, and wireless modems, have been driven down to the point where these devices are affordable to nearly everyone and the price of a wireless device is only a small part of the total cost to the end-user. To continue to attract new customers, wireless service providers concentrate on reducing infrastructure costs and operating costs, while improving quality of service in order to make wireless services cheaper and better.

One of the key service quality issues of any wireless network is providing complete and reliable radio frequency (RF) coverage. This is accomplished by eliminating (or at least minimizing) the number of RF "holes" in the geographical area of the wireless network. A hole is an area in which the RF signals from the base station or from the mobile station are blocked by terrain, buildings, vegetation, or any other object. When a wireless device (or mobile station) that is idle, but turned ON, moves into a RF hole, service may be lost (i.e., the mobile station is dropped) because the mobile station cannot receive the pilot channel signal, the paging channel signal, the synchronization channel signal, or other control channel signal. The mobile station must reacquire the wireless network when the mobile station moves out of the RF hole. If the mobile station is ON and active (i.e., handling a voice call or an Internet protocol (IP) data call), the mobile station may drop the call because the forward or reverse traffic channel signal is blocked.

Wireless services providers routinely monitor their wireless networks in order to detect RF holes. Wireless service providers have primarily relied on drive-testing, which uses specialized vehicles to determine coverage holes in the wireless network. Drive-testing is first performed during network launch and is then periodically repeated, depending on the operational plan of the service provider. The periodic tests are necessary to ensure no coverage holes have developed due to change in the terrain (new buildings) and changes in RF parameters in the system. Obviously, the more comprehensive and frequent such tests are, the quicker and more accurate will be the corrective actions of the service provider. However, such specialized tests are expensive to service providers.

During the past few years, pushed by the mobile E-911 effort, advanced location services have been defined to accurately determine the location of mobiles in times of emergency. The solutions for these location services can be mainly categorized into handset-based or network-based. Service providers can try to make use of these location services to determine coverage holes instead of drive tests. Network-based location determination requires that the mobile station location determination circuitry be positioned on network elements (e.g., base stations) in order to correlate power and round-trip delay information from various base stations. Unless the wireless service provider continuously monitors the location of all mobile stations, it is difficult to use that information to determine coverage holes. Also, continually monitoring the positions of all mobile stations consumes an excessive amount of RF bandwidth and processing power in the base stations. Furthermore, network-based location devices determine mobile station location using principles of extrapolation that often prove inaccurate.

Therefore, there is a need in the art for improved systems and methods for determining RF coverage holes in a wireless network. In particular, there is a need for an improved apparatus for determining the location of RF coverage holes in a wireless network that does not require the wireless network to continually monitor the positions of all mobile stations and does not required all mobile stations to continually transmit their position information to the wireless network.

SUMMARY OF THE INVENTION

To address the above-discussed deficiencies of the prior art, it is a primary object of the present invention to provide, for use in a mobile station capable of accessing a wireless network, an apparatus for reporting call drop location information associated with the mobile station to a server accessible via a communication network coupled to the wireless network. According to an advantageous embodiment of the present invention, the apparatus comprises: 1) a memory capable of storing mobile station current position information; and 2) a controller, coupled to the memory, capable of determining a geographic location of the mobile station at the time an ongoing call is dropped by the mobile station and storing the geographic location in the memory, wherein the controller is further capable of establishing a connection with the server at a later point in time and transmitting the geographic location over the wireless network to the server.

According to one embodiment of the present invention, the controller is further capable of determining a drop time at which the ongoing call is dropped by the mobile station and storing the drop time in the memory, wherein the controller is further capable of transmitting the drop time over the wireless network to the server.

According to another embodiment of the present invention, the apparatus further comprises a Global Positioning System (GPS) device coupled to the controller, wherein the controller determines the geographic location and the drop time using the GPS device.

According to still another embodiment of the present invention, the controller is further capable of encrypting the geographic location and the drop time prior to transmission to the server.

It is another primary object of the present invention to provide, for use in a mobile station capable of accessing a wireless network, an apparatus for reporting service loss location information associated with the mobile station to a server accessible via a communication network coupled to the wireless network. According to an advantageous embodiment of the present invention, the apparatus comprises: 1) a memory capable of storing mobile station current position information; and 2) a controller, coupled to the memory, capable of determining a geographic location of the mobile station at the time a control channel is lost by the mobile station and storing the geographic location in the memory, wherein the controller is further capable of establishing a connection with the server at a later point in time and transmitting the geographic location over the wireless network to the server.

In one embodiment of the present invention, the controller is further capable of determining a service loss time at which the ongoing call is dropped by the mobile station and storing the service loss time in the memory, wherein the controller is further capable of transmitting the service loss time over the wireless network to the server.

In another embodiment of the present invention, the apparatus further comprises a Global Positioning System (GPS) device coupled to the controller, wherein the controller determines the geographic location and the service loss time using the GPS device.

In still another embodiment of the present invention, the controller is further capable of encrypting the geographic location and the service loss time prior to transmission to the server.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
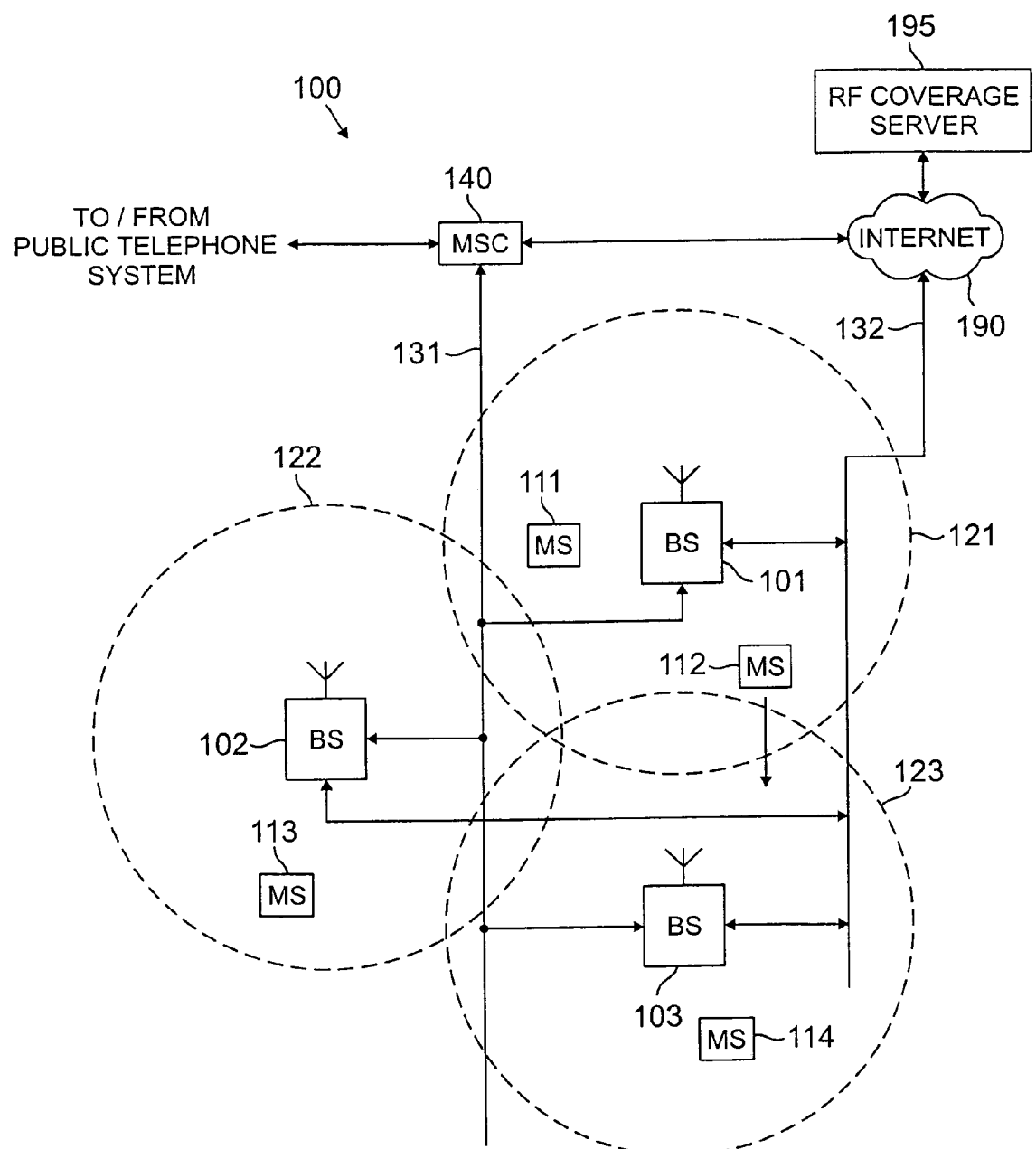
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over, for example, code division multiple access (CDMA) channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (ESC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center MSC) 140. Line 131 also provides the connection path to transfers control signals between MSC 140 and BS 101, BS 102 and BS 103 used to establish connections for voice and data circuits between MSC 140 and BS 101, BS 102 and BS 103.

Communications line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may a provide a transmission path for transmission of analog or digital control signals in a suitable signaling protocol.

MSC 140 is a switching device that provides services and coordination between the subscribers in a wireless network and external networks, such as the PSTN or Internet 190. MSC 140 is well known to those skilled in the art. In some embodiments of the present invention, communications line 131 may be several different data links where each data link couples one of BS 101, BS 102, or BS 103 to MSC 140. Alternatively, BS 101, BS 102 and BS 103 may transfer voice and data signals directly with Internet 190 via network communications line 132, thereby bypassing mobile switching center MSC) 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103.

Wireless network 100 further comprises radio frequency (RF) coverage server 195, which is used to detect RF holes in the RF coverage area of wireless network 100, including cell sites 121–123. According to the principles of the present invention, the wireless service provider that operates wireless network 100 distributes to some (and perhaps all) of its subscribers specially-equipped mobile stations (e.g., cell phones). Each of the specially-equipped mobile stations is equipped with a Global Positioning System (GPS) device that enables the mobile station to rapidly determine its position in the event that a call is dropped or service is dropped. This GPS information is the geographical position of the mobile station at the time the call was dropped or service was lost.

When service is restored, the mobile station establishes a session with RF coverage server 195 and relays the GPS position and/or time information to RF coverage server 195. Over time, RF coverage server 195 builds up a database of service drop/call drop position information only from those phones that actually experience a call or service drop. This information is used to establish a map of the coverage area of wireless network 100 that illustrates the location of RF coverage holes.

Figure 2:
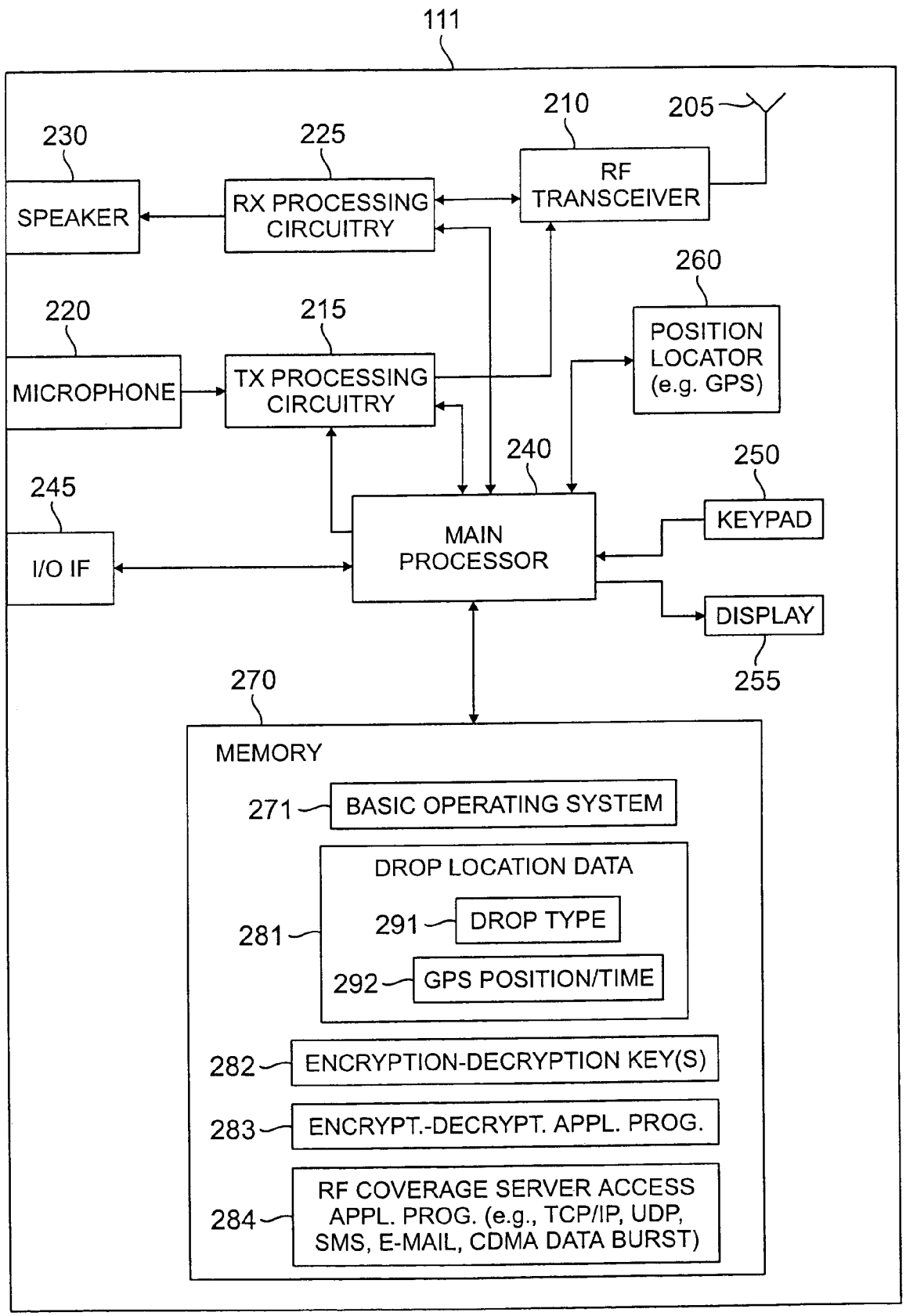
FIG. 2 illustrates an exemplary wireless mobile station in greater detail according to one embodiment of the present invention.

FIG. 2 illustrates exemplary wireless mobile station 111 in greater detail according to one embodiment of the present invention. Wireless mobile station 111 comprises antenna 205, radio frequency (RF) transceiver 210, transmitter (TX) processing circuitry 215, microphone 220, receiver (RX) processor circuitry 225, speaker 230, main processor 240, input/output (I/O) interface (IF) 245, keypad 250, display 255, and position locator 260, which may be, for example, a global positioning system (GPS) receiver. Wireless mobile station 111 further comprises memory 270, that stores basic operating system (OS) program 271, drop location data file 281, encryption-decryption key(s) file 282, encryption-decryption application program 283, and MS location server access application program 284. Drop location data file 281 comprises drop type field 291 and GPS position/time field 292.

Wireless mobile station 111 may be a cell phone, a personal digital assistant (PDA) device equipped with a wireless modem, a two-way pager, a personal communication system (PCS) device, or any other type of wireless mobile station.

RF transceiver 210 receives, from antenna 205, an incoming RF signal transmitted by a base station of a wireless communication network. RF transceiver 210 down-converts the incoming RF signal to produce an intermediate frequency (IF) or a baseband signal. The IF or baseband signal is sent to RX processing circuitry 225 that produces a processed baseband signal by filtering, decoding, and/or digitizing the baseband or IF signal to produce a processed baseband signal. RX processing circuitry 225 transmits the processed baseband signal to speaker 230 (i.e., voice data) or to main processor 240 for further processing (i.e., web browsing).

TX processing circuitry 215 receives analog or digital voice data from microphone 220 or other outgoing baseband data (i.e., web data, e-mail, interactive video game data) from main processor 240. TX processing circuitry 215 encodes, multiplexes, and/or digitizes the outgoing baseband data to produce a processed baseband or IF signal.

RF transceiver 210 receives the outgoing processed baseband or IF signal from TX processing circuitry 215. RF transceiver 210 up-converts the baseband or IF signal to an RF signal that is transmitted via antenna 205.

Main processor 240 may be implemented as a microprocessor or microcontroller. Main processor 240 executes basic OS program 271 in order to control the overall operation of wireless mobile station 111. In one such operation, main processor 240 controls the reception of forward channel signals and the transmission of reverse channel signals by RF transceiver 210, RX processing circuitry 225, and TX processing circuitry 215, in accordance with well known principles. Main processor 240 is also capable of controlling and/or interfacing with position locator 260 in order to transfer the location of MS 111 to memory 270.

Main processor 240 is capable of executing other processes and programs that are resident in memory 270. Main processor 240 can move data into or out of memory 270, as required by an executing process. Main processor 240 is also coupled to I/O interface 245. I/O interface 245 provides the mobile station with the ability to connect to other devices such as laptop computers and handheld computers. I/O interface 245 is the communication path between these accessories and main controller 240.

Main processor 240 is also coupled to keypad 250 and display unit 255. Keypad 250 is used by the end-user of the mobile station to enter data into the mobile station. Display 255, in the preferred embodiment, is a liquid crystal display capable of rendering text and/or at least limited graphics from Web sites. Alternate embodiments use other types of displays.

Memory 270 is coupled to main processor 240. Memory 270 may be comprised of solid-state memory such as random access memory (RAM), various types of read only memory (ROM), or Flash RAM. Memory 270 may also include other types of memory such as micro-hard drives or removable storage media that stores data. Memory 270 stores basic operating system 271 that provides the basic operational control of mobile station 111. Drop location data file 281 indicates the location and time of mobile station 111 at the time that service and/or a call was dropped.

Memory 270 also stores encryption-decryption key(s) 282 that are used to transfer position location information in drop location data file 281 to BS 101 and RF coverage server 195. The use of encryption-decryption keys enables the mobile station to transmit its location securely over-the-air and through public data networks.

Memory 270 also stores RF coverage server access application program 284, which enables MS 111 to transfer position data to RF coverage server 195 in FIG. 1. RF coverage server access application program 284 may be an e-mail program, a Transmission Control Protocol/Internet Protocol (TCP/IP) program, a User Datagram Protocol (UDP) program, a short messaging service (SMS) program, a CDMA data burst program, or any combination of these programs. These various types of communication programs are for illustration purposes only. The present invention is not limited to any one type or combination of server access programs.

Figure 3:
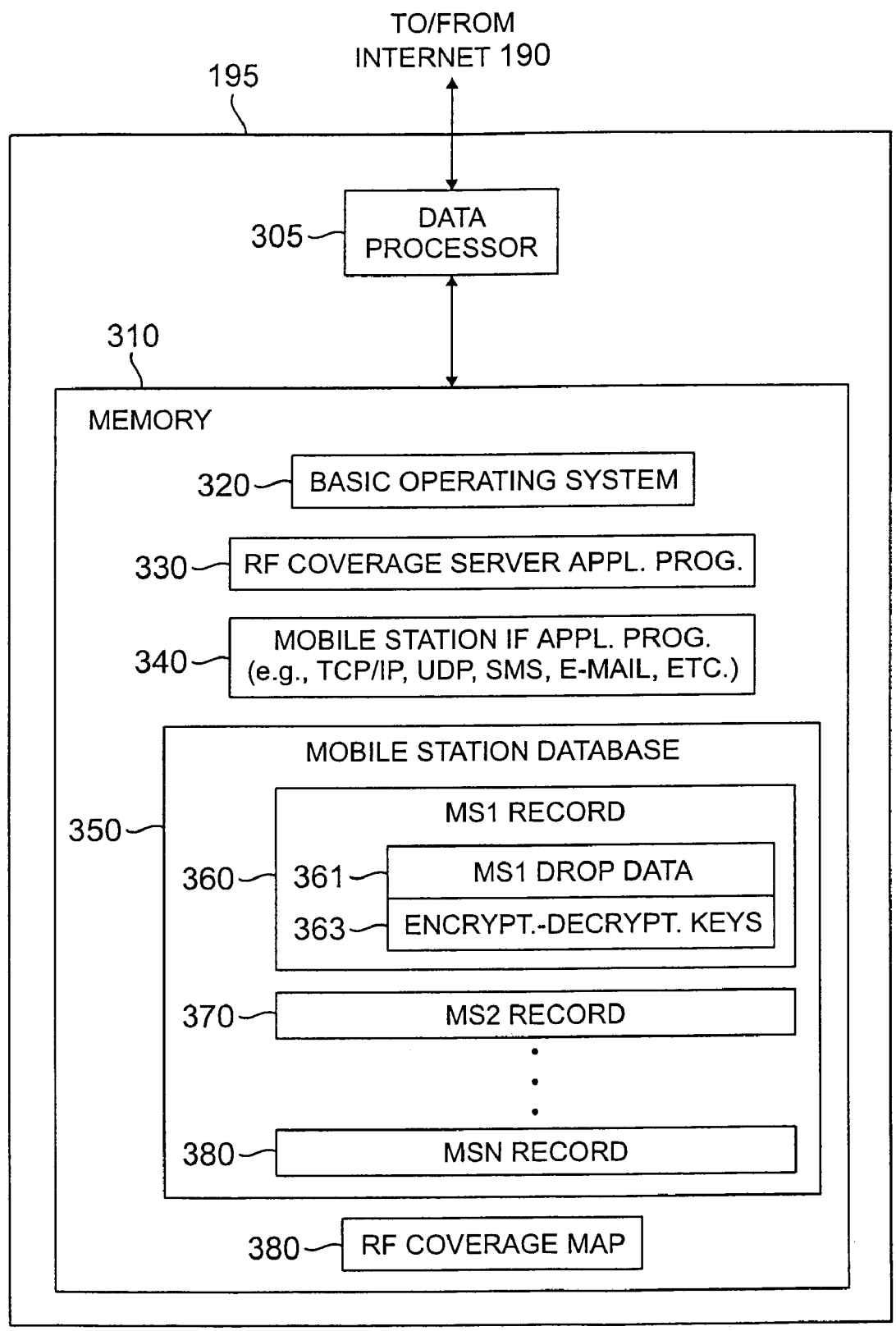
FIG. 3 illustrates an exemplary radio frequency (RF) coverage server in greater detail according to one embodiment of the present invention.

FIG. 3 illustrates exemplary radio frequency (RF) coverage server 195 in greater detail according to one embodiment of the present invention. RF coverage server 195 comprises data processor 305 and memory 310. Data processor 305, in one embodiment, is a microprocessor or microcontroller. Other embodiments use other types of controllers, such as parallel processors, for greater processing power. Data processors are well known in the art and are not discussed further.

Memory 310 may be comprised of solid-state memory such as random access memory (RAM), various types of read only memory (ROM), or Flash RAM. Memory 310 may also include other types of memory such as micro-hard drives or removable storage media that stores data.

Memory 310 is coupled to data processor 305 and stores basic operating system 320, RF coverage server application program 330, mobile station interface (IF) application program 340, mobile station database 350, and RF coverage map 380. Mobile station database 350 contains N mobile station records, including exemplary mobile station records 360, 370 and 380, which are arbitrarily labeled MS1 Record, MS2 Record, and MSn Record, respectively. Exemplary mobile station record 360 contains MS1 drop data field 361, and encryption-decryption key(s) 363. MS drop data field 361 contains the geographic location and time information for a particular mobile station (e.g., MS 111). Exemplary mobile station records 370 and 380 contain similar data fields.

Basic operating system 320 is run by data processor 305 in order to control the overall operation of the location server. RF coverage server application program 330 is responsible for securely gathering location information from mobile stations that have dropped calls or lost service and generating therefrom RF coverage map 380, which identifies RF coverage holes in wireless network 100. According to one embodiment of the present invention, RF coverage map 380 may be a simple two dimensional map showing dots, squares, or other icons that represent the locations of mobile stations at the time of a service loss or call drop. The map may illustrate drop location data gathered over an entire extended time period, such as a month, a week, or a day.

Alternatively, RF coverage map 380 may comprise multiple two dimensional maps for certain times of day, such as a first map that shows drop location data for the time period between 12 AM and 1 AM on a particular day, a second map that shows drop location data for the time period between 1 AM and 2 AM on the same day, a third map that shows drop location data for the time period between 2 AM and 3 AM on the same data, and so forth. Also, the maps may cover multiple days. For example, the first map may show drop location data for the time period between 12 AM and 1 AM for every day for an entire month.

Mobile station IF application program 340 communicates with RF coverage server access application program 284 in MS 111 in order to receive drop location data from MS 111. Mobile station IF application program 340 may comprise an e-mail program (e.g., EUDORA), a Transmission Control Protocol/Internet Protocol (TCP/IP) program, a User Datagram Protocol (UDP) program, a short messaging service (SMS) program, a CDMA data burst program, or any combination of these programs. These various types of communication programs are for illustration purposes only. The present invention is not limited to any one type or combination of server access programs.

According to an advantageous embodiment of the present invention, MS 111 and BS 101 may utilize new parameters in the Extended System Parameters message (Base Station-to-Mobile Station Paging Channel message) and in the Registration message in order to relay exact location and time information of MS 111 in the event of a call drop or a service loss. The present invention thus provides an efficient mechanism to report the call drop location and time information to RF coverage server 195 via the appropriate messaging, in the event of a call drop or service failure due to a coverage hole in wireless network 100. This enables the network operator to pinpoint the exact location of a call drop or service failure, thereby facilitating collection of valuable data to determine RF holes in wireless network 100.

The present invention greatly reduces the required efforts of wireless service providers to improve service coverage and to reduce dropped calls. Advantageously, the base station is not required to continually request location information from all mobiles, which is highly inefficient. The present invention discloses an efficient mechanism for identifying coverage holes with minimum additional impact on air-interface.

The invention may utilize intelligent triggers in the air-interface:

1. Two new trigger bits, REPORT SERVICE LOSS and REPORT CALL DROP are defined in the Extended System Parameters message and in-traffic system parameters message, 2. When REPORT SERVICE LOSS is set to True (e.g., Logic 1) for the current cell, if the mobile is idle and it loses service (pilot channel/sync channel/paging channel/access trouble), the mobile station stores the service loss location and time. This information should not be overwritten until it is reported to the base station.

3. When REPORT CALL DROP is set to True for the current cell, if the mobile is in a call and a call drops due to RF signal failure, the mobile station stores the call failure location and time. This information should not be overwritten until it is reported to the base station.

4. Usually, a mobile station loses service or a call, the mobile station tries to re-acquire the system. In doing so, the mobile station can send a registration message with additional information: which event (call drop/pilot signal/sync signal/paging signal/access failure) occurred, event location, and event time.

5. Field registration type (REG TYPE) in registration message is modified to include SERVICE RECONNECT as a new reason. Every time after the mobile station acquires the system, the mobile station should complete its regular registration processing, then send another registration message with the SERVICE RECONNECT reason, if it has stored an unreported call drop event or service loss event. For example, the following fields may be used in the registration message: integer event type (0=call drop, 1=pilot lost, 2=sync error, 3=paging error, 4=access failure, etc.), appropriate type to specify the event time, and an appropriate type to report the GPS location where the event happened.

Figure 4:
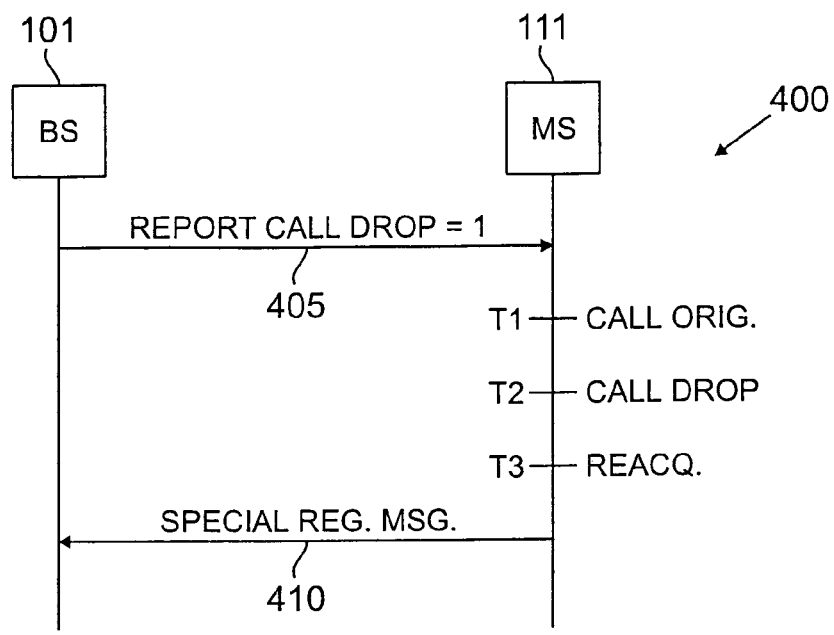
FIG. 4 is a message flow diagram illustrating the operation of a mobile station and a base station during a call drop according to an exemplary embodiment of the present invention.

FIG. 4 depicts message flow diagram 400, which illustrates the operation of mobile station 111 and base station 101 during a call drop according to an exemplary embodiment of the present invention. Initially, MS 111 has already accessed BS 101. BS 101 transmits control message 405 with REPORT CALL DROP set to Logic 1 (True). This alerts MS 111 to report call drop events. At time T1, MS 111 establishes a call (i.e., Call origination) with BS 101. At time T2, MS 111 enters an RF coverage hole and MS 111 drops the call (i.e., Call Drop) with BS 101. At time T3, MS 101 leaves the RF coverage hole and MS 111 reacquires (Reacq.) BS 101 (or some other base station). MS 111 then transmits special registration message 410 that reports the call drop event, location, and time.

Figure 5:
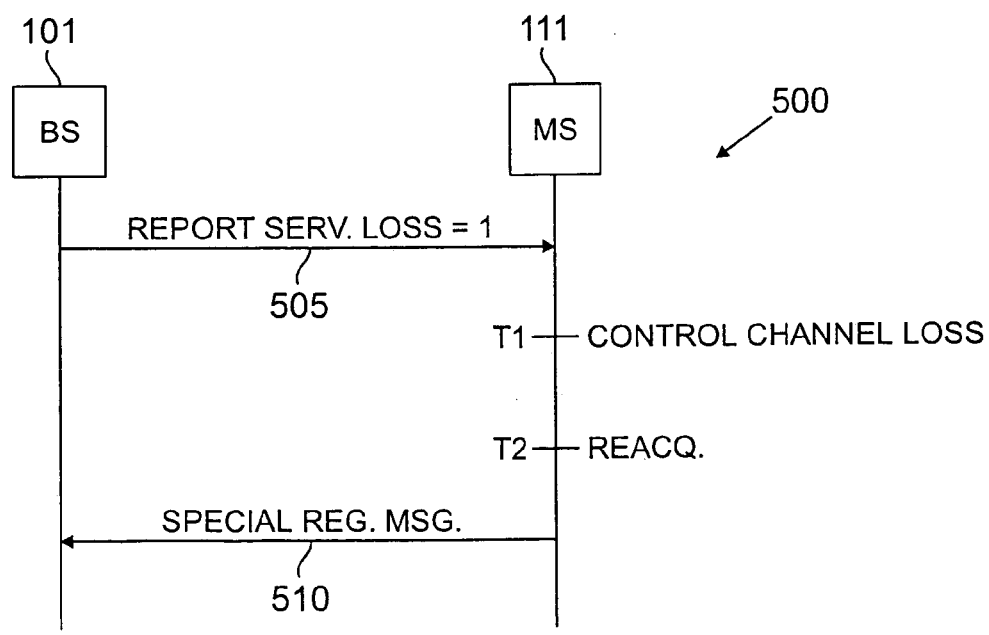
FIG. 5 is a message flow diagram illustrating the operation of a mobile station and a base station during a service loss according to an exemplary embodiment of the present invention.

FIG. 5 depicts message flow diagram 500, which illustrates the operation of mobile station 111 and base station 101 during a service loss according to an exemplary embodiment of the present invention. Initially, MS 111 has already accessed BS 101. BS 101 transmits control message 505 with REPORT SERVICE LOSS set to Logic 1 (True). This alerts MS 111 to report service loss events. At time T1, MS 111 enters an RF coverage hole and MS 111 loses service with BS 101 by losing one of the control channels (e.g., pilot, page, sync). At time T2, MS 101 leaves the RF coverage hole and MS 111 reacquires (Reacq.) BS 101 (or some other base station) MS 111 then transmits special registration message 510 that reports the service loss event, location, and time.

Advantageously, a service provider is not required to implement GPS position locator 260, drop location data file 281, and RF coverage server access application program 284 in every mobile station distributed to subscribers of wireless network 100. The present invention may adequately identify coverage holes in wireless network 100 even if only a subset of subscribers use mobile stations (i.e., cell phones) that are equipped according to the principles of the present invention. The wireless service provider need only ensure that an adequate number of phones are so equipped in order to obtain a good sampling of the RF coverage holes in wireless network 100. For example, if a wireless service provider has 200,000 subscribers in a certain metropolitan area (e.g., Dallas, Tex.), the wireless service provider may distribute, for example, 1,000, 5,000, or 10,000 mobile stations that are equipped as shown in FIG. 2 and according to the principles of the present invention. These mobile stations would then be used to identify holes in the RF coverage of wireless network 100.

Moreover, out of the subset of mobile stations that are equipped according to the principles of the present invention, the wireless service provider may further reduce the number of mobile stations that are reporting RF coverage holes by selectively enabling the present invention in only some of the equipped mobile stations. As explained in FIGS. 4 and 5, the equipped mobile stations only report a service loss event or a call drop event if the trigger bits REPORT SERVICE LOSS and REPORT CALL DROP, respectively, are enabled. If the service provider does not set these trigger bits as described with respect to FIGS. 4 and 5, then the mobile stations do not report service loss events or call drop events.

It should also be noted that the present invention may operate in the reverse manner by disabling the trigger bits REPORT SERVICE LOSS and REPORT CALL DROP. In other words, when a mobile station is powered ON, it may be enabled, by default, to report service loss events and call drop events. The trigger bits REPORT SERVICE LOSS and REPORT CALL DROP may then be used to disable (i.e., turn OFF) the reporting of service loss events or call drop events.

Although the present invention has been described in detail, those skilled in the art should understand that they may make various changes, substitutions and alterations herein without departing from the spirit and scope of the invention in its broadest form.

What is claimed is:

1. For use in a mobile station adapted to access a wireless network, an apparatus for reporting call drop location information associated with said mobile station to a server accessible via a communication network coupled to said wireless network, said apparatus comprising:

a memory adapted to store mobile station current position information; and a controller, coupled to said memory, adapted to determine a geographic location of said mobile station at the time an ongoing call is dropped by said mobile station and store said geographic location in said memory, wherein the controller is further adapted to establish a connection with said server at a later point in time and transmit said geographic location over the wireless network to said server in response to receiving an enable message from said server.

2. The apparatus as set forth in claim 1 wherein said controller is further adapted to determine a drop time at which said ongoing call is dropped by said mobile station and store said drop time in said memory, wherein the controller is further adapted to transmit said drop time over the wireless network to said server.

3. The apparatus as set forth in claim 2 further comprising a Global Positioning System (GPS) device coupled to said controller, wherein said controller determines said geographic location and said drop time using said GPS device.

4. For use in a mobile station adapted to access a wireless network, an apparatus for reporting call drop location information associated with said mobile station to a server accessible via a communication network coupled to said wireless network, said apparatus comprising:
- a memory adapted to store mobile station current position information; and
- a controller, coupled to said memory, adapted to determine a geographic location of said mobile station at the time an ongoing call is dropped by said mobile station and store said geographic location in said memory, wherein the controller is further adapted to establish a connection with said server at a later point in time and transmit said geographic location over the wireless network to said server in response to receiving an enable message from said server, and wherein said controller is further adapted to encrypt said geographic location prior to transmission to said server.

5. For use in a mobile station adapted to accessing a wireless network, an apparatus for reporting service loss location information associated with said mobile station to a server accessible via a communication network coupled to said wireless network, said apparatus comprising:
- a memory adapted to store mobile station current position information; and
- a controller, coupled to said memory, adapted to determine a geographic location of said mobile station at the time a control channel is lost by said mobile station and store said geographic location in said memory, wherein the controller is further adapted to establish a connection with said server at a later point in time and transmit said geographic location over the wireless network to said server in response to receiving an enable message from said server.

6. The apparatus as set forth in claim 5 wherein said controller is further adapted to determine a service loss time at which said ongoing call is dropped by said mobile station and store said service loss time in said memory, wherein the controller is further adapted to transmit said service loss time over the wireless network to said server.

7. The apparatus as set forth in claim 6 further comprising a Global Positioning System (GPS) device coupled to said controller, wherein said controller determines said geographic location and said service loss time using said GPS device.

8. For use in a mobile station adapted to access a wireless network, an apparatus for reporting service loss location information associated with said mobile station to a server accessible via a communication network coupled to said wireless network, said apparatus comprising:
- a memory adapted to store mobile station current position information; and
- a controller, coupled to said memory, adapted to determine a geographic location of said mobile station at the time a control channel is lost by said mobile station and store said geographic location in said memory, wherein the controller is further adapted to establish a connection with said server at a later point in time and transmit said geographic location over the wireless network to said server in response to receiving an enable message from said server, and wherein said controller is further adapted to encrypt said geographic location prior to transmission to said server.

9. For use in a mobile station adapted to access a wireless network, a method for reporting call drop location information associated with the mobile station to a server accessible via a communication network coupled to the wireless network, the method comprising the steps of:
- determining a geographic location of the mobile station at the time an ongoing call is dropped by the mobile station;
- storing the geographic location in a memory;
- establishing a connection with the server at a later point in time; and
- transmitting the geographic location over the wireless network to the server in response to receiving an enable message from the server.

10. The method as set forth in claim 9 further comprising the steps of:
- determining a drop time at which the ongoing call is dropped by the mobile station; and
- storing the drop time in the memory, wherein the controller is further adapted to transmit the drop time over the wireless network to the server.

11. The method as set forth in claim 10 wherein the mobile station comprises a Global Positioning System (GPS) device and the steps of determining the geographic location and the drop time are performed using the GPS device.

12. For use in a mobile station adapted to access a wireless network, a method for reporting call drop location information associated with the mobile station to a server accessible via a communication network coupled to the wireless network, the method comprising the steps of:
- determining a geographic location of the mobile station at the time an ongoing call is dropped by the mobile station;
- storing the geographic location in a memory;
- establishing a connection with the server at a later point in time;
- encrypting the geographic location; and
- transmitting the geographic location over the wireless network to the server in response to receiving an enable message from said server.

13. For use in a mobile station adapted to access a wireless network, a method for reporting service loss location information associated with the mobile station to a server accessible via a communication network coupled to the wireless network, the method comprising the steps of:
- determining a geographic location of the mobile station at the time when a control channel is lost by the mobile station;
- storing the geographic location in a memory;
- establishing a connection with the server at a later point in time; and
- transmitting the geographic location over the wireless network to the server in response to receiving an enable message from said server.

14. The method as set forth in claim 13 further comprising the steps of:
- determining a service loss time at which the control channel is lost by the mobile station; and storing the service loss time in the memory, wherein the controller is further adapted to transmit the service loss over the wireless network to the server.

15. The method as set forth in claim 14 wherein the mobile station comprises a Global Positioning System (GPS) device and the steps of determining the geographic location and the service loss time are performed using the GPS device.

16. For use in a mobile station adapted to access a wireless network, a method for reporting service loss location information associated with the mobile station to a server accessible via a communication network coupled to the wireless network, the method comprising the steps of:
   determining a geographic location of the mobile station at the time when a control channel is lost by the mobile station;
   storing the geographic location in a memory;
   establishing a connection with the server at a later point in time;
   encrypting the geographic location; and
   transmitting the geographic location over the wireless network to the server in response to receiving an enable message from said server.

17. A wireless network comprising a plurality of base transceiver stations adapted to communicate with mobile stations located in a coverage area of said wireless network, wherein said wireless network is adapted to receive from selected ones of said mobile stations geographic location data indicating positions of said selected mobile stations at the time at least one of a service loss event and a call drop event occurred and wherein said wireless network transmits said received geographic location data to a server adapted to identify radio frequency coverage holes in said coverage area of said wireless network, wherein said wireless network is adapted to transmit to a first one of said selected mobile stations an enable message adapted to cause said first selected mobile station to transmit said geographic location data to said wireless network after said first selected mobile station re-establishes a wireless connection to said wireless network after said at least one of a service loss event and a call drop event.

18. The wireless network as set forth in claim 17 wherein said wireless network is adapted to transmit to a first one of said selected mobile stations a disable message adapted to disable said first selected mobile station from transmitting said geographic location data to said wireless network after said first selected mobile station re-establishes a wireless connection to said wireless network after said at least one of a service loss event and a call drop event.

19. The wireless network as set forth in claim 17 wherein said server is adapted to generate a two-dimensional map identifying said radio frequency coverage holes in said coverage area of said wireless network.

* * * * *